Jan. 27, 1959     J. SIVERTSEN     2,870,630
INDUCTANCE STRAIN GAUGES
Filed March 5, 1954
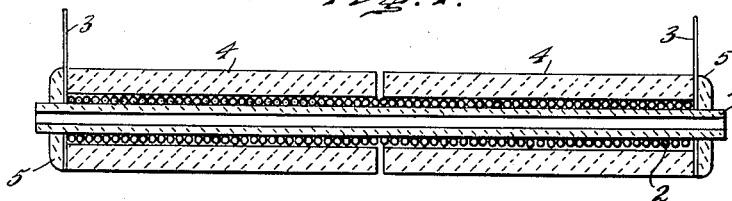
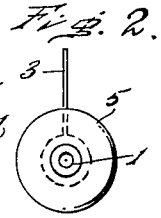
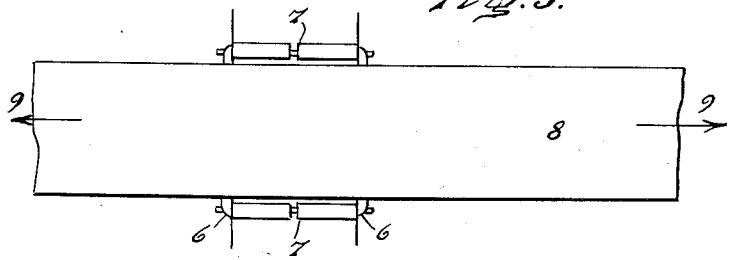
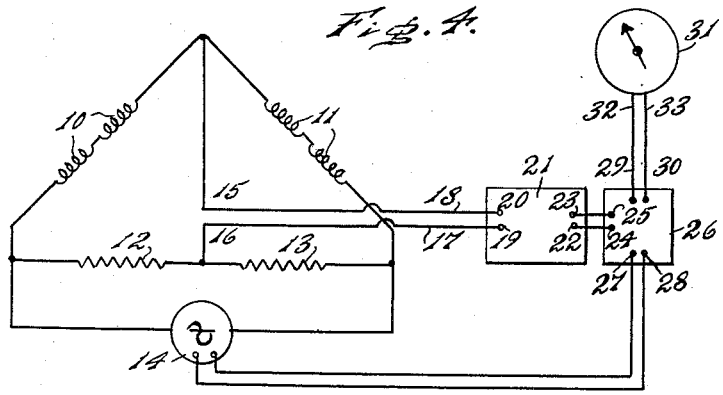
INVENTOR
Jens Sivertsen
BY
ATTORNEY

United States Patent Office 2,870,630
Patented Jan. 27, 1959

2,870,630

INDUCTANCE STRAIN GAUGES

Jens Sivertsen, Philadelphia, Pa.

Application March 5, 1954, Serial No. 414,318

5 Claims. (Cl. 73—88.5)

This invention relates to strain gauges and particularly to a type that varies the inductance as a function of the strain in the specimen to be tested.

The presently used strain gauges are mostly of the resistance type, i. e. a thin resistance wire is in its entire length cemented to the specimen to be tested or to a suitable base, which, in turn, over its entire length is cemented to the specimen. When the wire elongates, the resistance wire is elongated with the specimen. The inherent reduction of the resistance wire in cross section together with the lengthening of the wire produces an increase in resistance which should be a linear function of the strain; or the elongation of the wire is such that:

$$1.7 = \frac{\frac{\text{Increase in resistance}}{\text{Resistance at start}}}{\frac{\text{Increase in length}}{\text{Length at start}}} = \frac{\frac{\Delta R}{R_0}}{\frac{\Delta L}{L_0}}$$

where $R_0$ = Resistance at start
$L_0$ = Gauge length
$\Delta R$ = Change in resistance
$\Delta L$ = Change in length The coefficient 1.7 is given by Poisons Ratio.

For some unexplained reason, this coefficient is not 1.7 but nearly 2 and is not the same for all resistance materials, and does not seem to be quite a linear function of the strain.

These facts seem to point out that the phenomenon is not as simple as here explained and it cannot be expressed as a simple mathematical function.

The resistance type strain gauge also suffers from temperature errors which cause changes in resistance, and therefore are of the same kind as the changes caused by the strain. By arranging the gauges in an electric bridge circuit and applying dummy gauges attached to the same specimen when possible, the temperature errors can to a great extent be limited.

Moisture absorbed by the gauges will open up additional paths for the electric current and in the circuit act as change in the resistance of the strain gauge.

With all of these obvious defects, the resistance gauges very often give reasonably accurate results when great precautions are taken. The application and use of the gauges is quite an art where experience in application of the glue and other factors involved can substitute for precise mathematical relationships and straightforward applications.

Since a real good strain gauge of small dimensions and light weight is badly needed, the present disclosure is the result of the necessary research and development.

The electrical inductance of a coil depends upon the number of turns in the winding and the physical dimensions. A number of formulas have been developed expressing this and basically they mean the same thing.

If L is the length of the coil; $r$ the radius of the coil and $n$ is the number of turns, the formula is expressed:

$L_0$ the inductance of the coil $$L_0 = \frac{r^2 \cdot n^2}{9r + 10L}$$

If we plot this inductance value as a function of the ratio $$\frac{L}{r}$$

for values of $$\frac{L}{r}$$

more than $$\frac{4}{1}$$

$L_0$ is almost a linear function of 1. If we make the ratio $$\frac{10}{1}$$

the linearity is within ½ of 1% and if we make the ratio $$\frac{20}{1}$$

the linearity is better than 1/10 of 1%. This will apply to relatively large changes in L. For small changes in L the linearity is even better.

Of course this type of coil is not very efficient as an induction coil but quite sensitive to dimensional changes. By applying this coil together with the proper frequency, the proper reactance can be obtained, and we have a strain gauge where a mathematical relationship obtains between the strain and the reactance, i. e. the voltage drop in the reactor.

If the gauge is applied in an A. C. bridge circuit we will have a very accurate strain measuring device.

The formula $$L_0 = \frac{r^2 \cdot n^2}{9r + 10l}$$

is the same as $$X = 2\pi f L_0 = 2\pi f \frac{r^2 \cdot n^2}{9r + 10l}$$

where $X$ equals reactance of coil
$f$ equals frequency of A. C. current
$r$ equals radius of coil
$n$ equals number of turns in coil
$l$ equals total length of coil
$L_0$ equals total length of coil at start The admittance of coil $$b = \frac{1}{X} = \frac{1}{2\pi f} \cdot \frac{9r + 10l}{r^2 \cdot n^2}$$

or $$b = \frac{1}{2\pi f} \left( \frac{9r}{r^2 \cdot n^2} + \frac{10l}{r^2 \cdot n^2} \right) = K \cdot l$$

If we regard $9r$ as being very small compared to $10l$ and practically constant, we find $$b_0 + \Delta b = K(l_0 + \Delta l)$$

where $K$ = constant
$b_0$ = admittance at start
$\Delta b$ = change in admittance
$\Delta l$ = change in length Of course, the coil also has some resistance which also will be subject to temperature errors. These errors are easily diminished or completely eliminated by the following method:

(1) The frequency selection is such that the reactance of the coil is large relative to its inductance. The ratio can easily be made 6:1; 10:1 or 20:1, or more. Practically, 6:1 gives adequate results.

(2) We can arrange a dummy gauge adjacent to the active gauge, thereby to eliminate temperature effects.

(3) The detecting circuit which changes the A. C. output from the bridge circuit into D. C. for the meters or recorders can be of the phase discriminating type. In this way alone results have been obtained experimentally where a resistance unbalance of 70 caused a meter reading of 2, while a reactance unbalance of 2 caused a meter reading of 100.

Point 3 alone will therefore give a discrimination of:

$$\frac{100}{2} \times \frac{70}{2} = \frac{7000}{4} = 175$$

In other words, the arrangement was 175 times more sensitive to strain than to temperature variations.

Another advantage inherent in these inductance gauges relatively to resistance gauges is that in order to obtain as high voltage output as possible from the bridge circuit, a user would like to apply as much voltage as possible across each strain gauge.

If for example, a resistance gauge has a resistance of 100 ohms and we apply across the gauge 10 volts, we will obtain a current of 100 milliamps through the gauge. This will cause a heating effect upon the resistance wire of $$\tfrac{1}{10} \text{ amp} \times 10 \text{ volt} = 1 \text{ watt}$$

This effect will change the resistance of the gauge and also of the bridge circuit output in value if the dummy gauge is not arranged exactly like the active gauge but has different heat conductivity parameters.

If our reactance gauge is similarly arranged to have an impedance of 100 ohms with a voltage across of 10 volts, the current will be the same, 100 milliamps but the heating effect will only be:

$$RI^2 = 15\left(\frac{1}{10}\right)^2 = .15 \text{ watt}$$

If the effective resistance of the gauge is 15 ohms:

I. e. less than 1/6 of the heating of the resistance gauge.

The theoretical and practical investigation of this problem has led to the practical gauge as hereinafter explained.

With the foregoing and other objects in view as will hereinafter clearly appear, my invention comprehends a novel inductance strain gauge.

Figure 1 is a longitudinal section of an inductance strain gauge, embodying my invention.

Figure 2 is an end elevation of Figure 1.

Figure 3 is a view showing the gauge connected with a specimen to be tested.

Figure 4 is a wiring diagram.

Similar numerals of reference indicate corresponding parts.

Referring to the drawings.

In Figure 1 the size of the strain gauge is greatly magnified. The length dimension is approximately 1/2", outside diameter a little more than 1/16" and the weight is approximately 1/95 of one ounce.

1 is an elastic core of fibreglass or other suitable material which may be tubular and with or without an elastic coating. An electric wire 2 is wound on the core 1 and may be embedded in the elastic core. The ends of the winding are soldered or welded to terminals 3. Two electric and magnetic shields 4 are slipped on the core to fit snugly thereon with practically no clearance. The shields 4, terminals 3, winding 2 and core 1 are cemented together at the ends as at 5.

When the ends at 5 are pulled axially away from each other, the construction allows for the inside elastic core and the winding to extend itself axially. The amount of extension required is very slight. The most that can ever be encountered in elastic and vibration testing is with material having a very high elastic limit. If we, for example, had a very superior tool steel with an elastic limit of 300,000 lbs./inch, each inch would elongate $10/1000$ inch inside the elastic limit. For any type of vibration problem, this would be the limit. A half inch long strain gauge would therefore be subjected to a maximum of $5/1000''$ extension. The gauge is actually able to extend elastically more than three times this amount due to its spring construction. The gauge would still be reusable for a new test. In this respect this gauge is superior to those on the market.

If more elongation is needed as in the testing of soft metals and plastics, the gauge can be used beyond this range, into the plastic range of the material.

In Figure 3 two strain gauges 7 are shown on an enlarged scale fastened to opposite sides of a test specimen 8 by means of cement 6 at the ends, or in any other suitable way. When a force 9 stretches the specimen 8, the core and the coil of the strain gauge will be subjected to the same elongation.

In Figure 4, I have shown a block diagram of a bridge circuit which can be used with the strain gauges. 10 and 10 indicate two active strain gauges arranged like the gauges 7—7 in Figure 3. 11—11 are two similar gauge arranged as dummies in the opposed arm of the bridge. 12 and 13 are precision resistors forming the other half of the bridge. 14 is an A. C. generator supplying the bridge with the proper A. C. voltage and current. The output terminals 15 and 16 of the bridge are connected by means of the wires 17 and 18 to the input terminals 19 and 20 of an amplifier 21.

From the output terminals 22 and 23 of the amplifier, the amplified signal goes to one set of terminal 24 and 25 of a phase sensitive detector 26.

The A. C. generator 14 supplies the terminals 27 and 28 a reference voltage of constant magnitude and phase.

The output terminals 29 and 30 of the phase sensitive detector 26 is connected to the D. C. meter 31 by means of the wires 32 and 33. The action of the phase sensitive detector is such that it will put out to the meter a D. C. voltage proportional to that component of the A. C. output from the amplifier 21 which is in phase with the reference voltage supplied by the generator 14 to terminals 27 and 28.

The amplifier 21 contains adjusting means whereby the phase angle of the output is set such that the voltage caused by inductance unbalance in the bridge will be in phase with the reference voltage, while resistance unbalance will be 90° away in phase and therefore will have no influence upon the output to the meter 31.

Such phase sensitive arrangements have been described in previous patents by this inventor many years ago and also described in articles in electronic magazines and trade publications and are presently used in the electronic arts.

From the foregoing description it will be apparent that the electrical arrangement is such that dimentional changes in the specimen and therefore the strain gauge will cause the meter to indicate said changes, but changes in resistance of the strain gauge are cancelled out. In other words, the gauge is still sensitive to resistance changes caused by temperature, but due to the three steps taken to nullify these changes, the error is completely eliminated or is very slight. These three steps are:

(1) Resistance is made a small part of the total impedance of the strain gauge.

(2) A corresponding dummy is used adjacent each strain gauge to cancel resistance effects.

(3) The phase sensitive detector cancels out resistance unbalance.

The reason that these three steps are necessary is that all arrangements consists of components as does the circuit. These are not idealized components but practical components with limitations. Taken together, they give the resuired results.

Having thus described my invention, what I claim as new and desire to secure by letters patent is:

1. In a strain gauge, a solenoid having a yielding core and a winding around the core, and a magnetic shield surrounding the winding, the outer ends of the core, and shield and end convolutions of the winding being permanently and mechanically connected to yield axially as a unit.

2. The construction defined in claim 1, wherein said winding expands axially under strain and is free to contract radially due to the yielding nature of the core.

3. In a strain gauge, an elongated, non-metallic, elastic core, an electro-magnetic winding on said core, a longitudinally expansible, tubular, conducting magnetic shield within which said winding has a close fit, the ends of said core, and shield and the end convolutions of the winding being permanently and mechanically connected together to yield axially as a unit when attached to a specimen under test, and means to apply an alternate electric current to said winding.

4. An alternating current reactance strain gauge to be fastened to the surface of a specimen to be tested, comprising a cylindrically shaped winding and a concentric metal containing magnetic shield surrounding said winding, the end convolutions of the winding and the ends of the shield being permanently and mechanically connected, and in which the response of strain versus reactance of the coil is substantially defined by the formula:

$$X = \frac{2\pi f r^2 . n^2}{9r + 10l} = \frac{2\pi f r^2 . n^2}{9r + 10(l_0 + \Delta l)}$$

where
$x$ equals reactance of coil
$r$ equals radius of winding
$n$ equals number turns in winding
$l$ equals total-length of winding at any time i. e.
$l$ equals $l_0$
$l_0$ equals length of winding before straining occurs
$\Delta l$ equals increase in length of specimen and strain gauge (i. e. strain)
$f$ equals frequency of alternating current 5. An alternating current admittance type strain gauge to be fastened to the surface of a specimen to be tested, comprising a cylindrically shaped winding and a concentric, metal containing magnetic shield surrounding said winding, the end convolutions of the winding and the ends of the shield being permanently and mechanically connected, and in which the response of strain versus admittance is substantially defined by the following formula:

$$b = \frac{1}{2\pi f}\left(\frac{9r}{r^2 . n_2} + \frac{10l}{r^2 . n^2}\right)$$

or $$b_0 + \Delta b = K(l_0 + \Delta l)$$

or $$b = Kl$$

where
$b$ equals admittance of coil
$b_0$ equals admittance before straining occurs
$\Delta b$ equals change in admittance
$K$ equals a constant References Cited in the file of this patent
UNITED STATES PATENTS

| | | |
|---|---|---|
| 2,144,353 | Weis | Jan. 17, 1939 |
| 2,242,011 | Malmberg | May 13, 1941 |
| 2,448,296 | Cary | Aug. 31, 1948 |
| 2,467,752 | Howe | Apr. 19, 1949 |
| 2,484,164 | Hathaway | Oct. 11, 1949 |
| 2,525,587 | Cahn | Oct. 10, 1950 |
| 2,544,152 | Gusdorf | Mar. 6, 1951 |
| 2,571,718 | Howes | Oct. 16, 1951 |
| 2,605,635 | Hast | Aug. 5, 1952 |